(12) United States Patent
Dawson et al.

(10) Patent No.: US 8,910,058 B2
(45) Date of Patent: Dec. 9, 2014

(54) PERFORMING INTERACTIVE COLLABORATION WITHIN A VIRTUAL WORLD

(75) Inventors: Christopher J. Dawson, Arlington, VA (US); Michael J. Osias, Westtown, NY (US); Brian W. Sledge, Shreveport, LA (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/568,835

(22) Filed: Sep. 29, 2009

(65) Prior Publication Data

US 2011/0078592 A1    Mar. 31, 2011

(51) Int. Cl.
*G06F 3/048* (2013.01)
*G06Q 10/10* (2012.01)
(52) U.S. Cl.
CPC ........................................ *G06Q 10/10* (2013.01)
USPC ........................................... 715/757; 715/772
(58) Field of Classification Search
USPC ................................................ 715/757, 772
See application file for complete search history.

(56) References Cited

U.S. PATENT DOCUMENTS

| | | | |
|---|---|---|---|
| 6,215,498 B1 * | 4/2001 | Filo et al. ........................ | 345/419 |
| 6,842,175 B1 | 1/2005 | Schmalstieg et al. | |
| 6,864,903 B2 | 3/2005 | Suzuki | |
| 7,107,312 B2 | 9/2006 | Hackbarth et al. | |
| 2004/0261013 A1 * | 12/2004 | Wynn et al. ..................... | 715/511 |
| 2007/0011273 A1 * | 1/2007 | Greenstein et al. ............ | 709/217 |
| 2009/0089225 A1 * | 4/2009 | Baier et al. ...................... | 706/12 |

OTHER PUBLICATIONS

Jarvis, S. et al., "Collaborative Volume Visualization with Applications to Underwater Acoustic Signal Processing," Proceedings of SPIE Aerosense, 2000, Orlando, FL, Apr. 24-26, 2000, vol. 4052, pp. 346-352.
Fraser, M. et al., "Supporting Awareness and Interaction through Collaborative Virtual Interfaces," Proceedings of the 12th annual ACM symposium on user interface software and technology, Asheville, NC, 1999, vol. 1, pp. 27-36.
Deray, K., "Avatars: A Shifting Interaction," Copyright 2002, Australian Computer Society, Inc. Appeared at the Pan-Sydney Area Workshop on Visual Information Processing (VIP2001), Sydney, Australia. Conferences in Research and Practice in Information Technology, vol. 11. 10 pages.
Hindmarsh, J. et al., Object-Focused Interaction in Collaborative Virtual Environments, ACM Transactions on Computer-Human Interaction, vol. 7, No. 4, Dec. 2000, pp. 477-509.
Duval, T. et al., "A Migration Mechanism to Manage Network Troubles while Interacting within Collaborative Virtual Environments," Copyright 2006 by the Association for Computing Machinery, Inc., VRCIA 2006, Hong Kong, Jun. 14-17, 2006, pp. 417-420.

* cited by examiner

*Primary Examiner* — Tadeese Hailu
*Assistant Examiner* — Darrin Hope
(74) *Attorney, Agent, or Firm* — William E. Schiesser; Keohane & D'Alessandro LLC

(57) ABSTRACT

The present invention provides a system and method for building collaboration work environments within the virtual world through computer generated (and possibly controlled) avatars and other three dimensional (3D) objects. It provides a solution to a problem where computer generated avatars and objects visually represent the execution, progress and output of a collaboration project. It provides the system and method for quickly visualizing collaboration activities and outputs to allow people to quickly and easily track progress of said activities. Visually representing collaboration activities allows observers to identify the number and different types of collaboration activities which are currently occurring, the progress of each collaboration activity, the system or component that the collaboration activity is creating or any problems or issues identified during activities supporting the collaboration work effort.

22 Claims, 7 Drawing Sheets

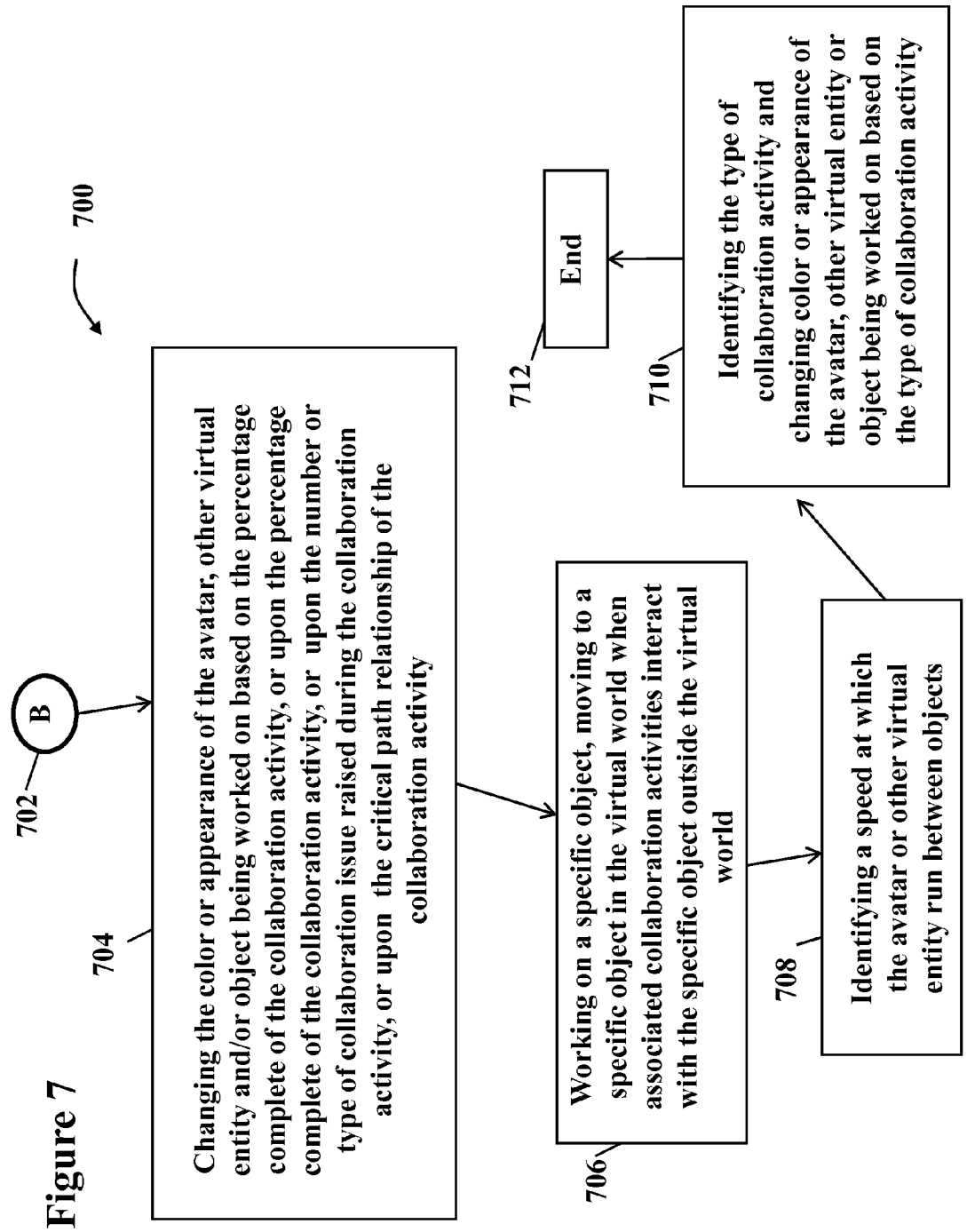

PERFORMING INTERACTIVE COLLABORATION WITHIN A VIRTUAL WORLD

FIELD OF THE INVENTION

The present invention provides for a system and methods for building collaboration work environments within a virtual world through computer generated avatars and other three dimensional (3D) objects in a virtual world. The present invention also provides for business applications for allowing collaboration, collaboration activities and collaboration output that are rendered within the 3D virtual world.

BACKGROUND OF THE INVENTION

Avatars in virtual worlds can have a wide range of business and social experiences, and such experiences are becoming more important as business and social transactions are becoming common in 3D virtual worlds such as Second Life. Second Life® is a registered trademark of Linden Lab. A virtual world is a computer-based simulated environment intended for its users to inhabit and interact via avatars. The characteristics of an avatar may play important social, business, and other related roles in virtual worlds. Virtual worlds are computed and managed by a large array of servers that are owned and maintained by the virtual world provider. A virtual world client program may provide its users (referred to as residents) with tools to view, navigate, and modify the virtual world and participate in its virtual economy. Social and business interactions are important in virtual worlds, and these interactions include resident interactions in both personal and business meetings.

An example may be a globally distributed team tasked with designing a jet airplane. Such collaboration can be represented as a set of avatars that are visually rendered performing the multiple design tasks along with visually rendering the different parts required to complete the jet airplane design.

An information technology (IT) data center in a virtual universe is most often represented as a collection of server racks, operational consoles, storage subsystems and network hardware. This is due to the fact that, when one walks through a real data center, all that can be observed is the infrastructure hardware and consoles. The problem with this is that for everyone, except the IT personnel, the view is meaningless and cannot be easily connected to what is understandable by customers, executive management, business owners, finance staff, and in most cases even application development. However, in the three dimensional (3D) world, it is possible to render views of a virtual data center that can be understood by anyone.

Virtual worlds and universes (these terms may be used interchangeably herein) represent the latest technological forefront and present a tremendous new platform for improving how people interpret what can be seen within a virtual data center, thereby improving an organization's understanding of the IT environment's impact on the business. These new capabilities will also enable innovative techniques for leveraging activities (either business or IT) and/or triggers to provide visualizations that represent different contexts not previously available. Therefore, there is a need to solve the problems associated as described above.

SUMMARY OF THE INVENTION

The present invention provides a system and methods for building collaboration work environments within the virtual world through computer generated avatars and other three dimensional (3D) objects. The present invention illustrates how business applications for collaboration, collaboration activities and collaboration output are rendered within the 3D virtual world.

The present invention enables visual representation of collaboration activities within a virtual world.

It further provides the ability to know in real time who is actively working on a specific activity or deliverable. It may provide a method for collaborating work environments within a virtual world, which is outside of a real world, through computer generated avatars and other three dimensional (3D) objects to visualize collaboration activities and outputs and allow people to quickly and easily track progress of activities. The method may comprise visually representing collaboration activities, identifying the number and different types of collaboration activities currently occurring identifying the progress of each collaboration activity, identifying the system or component that the collaboration activity is creating and identifying any problems or issues identified during activities supporting the collaboration activities.

It may further comprise a system for collaborating work environments within a virtual world, which is outside of a real world, through computer generated avatars and other three dimensional (3D) objects to visualize collaboration activities and outputs and allow people to quickly and easily track progress of activities. The system may comprise a visual component for visually representing collaboration activities, a number and type activity identifying component for identifying the number and different types of collaboration activities currently occurring a progress activity identifying component for identifying the progress of each collaboration activity, an activity creating component for identifying the system or component that the collaboration activity is creating and a component for identifying any problems or issues identified during activities supporting the collaboration activities.

It may further comprise a computer program product embodied in a computer readable medium for operating in a system comprising a processing unit, a memory, a bus, and input/output (I/O) interfaces, for implementing a method comprising visually representing collaboration activities, identifying the number and different types of collaboration activities currently occurring identifying the progress of each collaboration activity, identifying the system or component that the collaboration activity is creating; and identifying any problems or issues identified during activities supporting the collaboration activities.

It may further comprise a method for deploying computing infrastructure comprising integrating computer-readable code into a computing system, wherein the code in combination with the computing system is capable of performing a process for collaborating work environments within a virtual world, which is outside of a real world, through computer generated avatars and other three dimensional (3D) objects to visualize collaboration activities and outputs and allow people to quickly and easily track progress of activities, the process comprising visually representing collaboration activities, identifying the number and different types of collaboration activities currently occurring identifying the progress of each collaboration activity, identifying the system or component that the collaboration activity is creating, and identifying any problems or issues identified during activities supporting the collaboration activities.

BRIEF DESCRIPTION OF THE DRAWINGS

These and other features of this invention will be more readily understood from the following detailed description of the various aspects of the invention taken in conjunction with the accompanying drawings in which:

FIG. 7 illustrates another embodiment of the method of the present invention.

Figure 1:
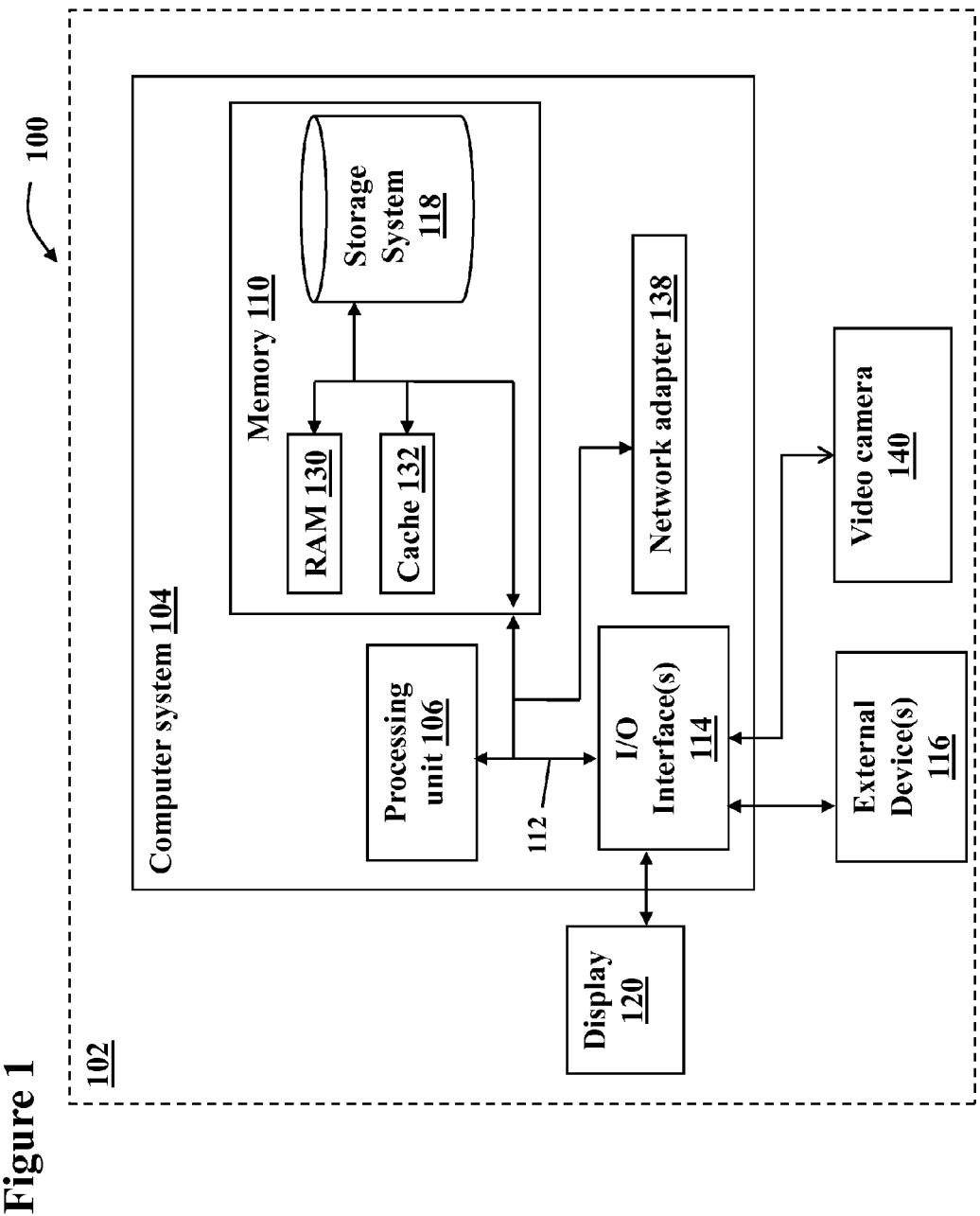
FIG. 1 shows a data processing system suitable for implementing an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

The present invention comprises a system and method for building collaboration work environments within the virtual world through computer generated (and possibly controlled) avatars and other three dimensional (3D) objects. The present invention further provides for business applications for collaboration, collaboration activities and collaboration output are rendered within the 3D virtual world.

One example could be of a globally distributed team tasked with designing a jet airplane. Such collaboration can be represented as a set of avatars that are visually rendered performing the multiple design tasks along with visually rendering the different parts required to complete the jet airplane design.

Another example may be collaboration projects and applications required to enable collaboration. It is very difficult to be able to quickly see progress of these collaboration projects when there are many people involved and especially when these people are dispersed all around the world. It is therefore necessary to implement a system and method that is able to visualize the execution and progress of such collaboration projects such that people can quickly and easily understand current collaboration activities in progress and how close the collaboration project is to completion. The present invention, therefore, provides a solution to this problem where a computer generated avatars and objects visually represent the execution, progress and output of a collaboration project.

The present invention provides the ability to quickly visualize collaboration activities and outputs will allow people to quickly and easily track progress of the activities. For example, visually representing collaboration activities will allow observers to identify:

the number and different types of collaboration activities currently are occurring;

the progress of each collaboration activity;

the system or component that the collaboration activity is creating; or the problems or issues identified during activities supporting the collaboration work effort.

For example, a jet propulsion scientist in the real (or physical) world, represented as an avatar in a virtual world may be responsible for designing the jet propulsion system of the airplane, the jet propulsion system of the airplane also represented in the virtual world. There are a number of similar collaboration activities that are currently being executed to design other parts/systems required to complete the overall design of the jet airplane. In the physical world, there is no simple way for the overall design lead to quickly and easily monitor the progress for each part or system. Using the present invention, the lead designer can walk around the virtual collaboration work environment and "watch" the design activities being executed and even walk up to the part being designed and "observe" how much of the part/system is in-process or actually completed. The number of computer generated avatars represents the number of collaboration activities currently being executed. The proximity of the computer generated avatars in relationship to the part/systems represent the which components that the designers are working on. The color of the jet parts/systems may represent the current progress, status or issues during collaboration of the design activities. Therefore the value to the lead designer is that he or she can quickly identify and mitigate any problems relative to (but not limited to) either design progress or issues.

A first portion of the present invention is to enable visual representation of collaboration activities within a virtual world. Using current art, it may be possible to render a real world environment (for example, a datacenter, an IT environment, etc.) in the virtual world. There are many collaboration activities that may occur in the real world such as peer-to-peer interactions or document sharing. In addition, the visualization of the present invention makes it possible to always know in real time who is actively working on a specific activity or deliverable. In the real world one would have to poll members of the project team to know whether they were working on a specific activity or deliverable at that point in time. The visualization of the collaboration work environment enables the avatar to walk around and interact with others avatars he/she sees actively working on the activity or deliverable of interest. The present invention provides a system and methods to visualize these collaboration activities within the confines of the virtual world, such as avatars that can visually see progress of these collaboration activities. Each of the objects that are affected by the collaboration activity may be rendered in the virtual world. For example, a collaboration activity to design a cockpit may have the specifications and components represented as virtual objects. If the activity crossed multiple components, such as designing a jet propulsion system, both the jet engine and engine control system may be represented in the virtual world.

When the collaboration activity is initiated, information about the progress and status of the activity may be relayed to the virtual world environment. A computer generated avatar or other virtual entity in the virtual may represent the collaboration activity.

The object being worked on by the avatar or other virtual entity may represent the output of that specific collaboration activity. The computer generated avatar or other virtual entity and object being worked on:

may move to a specific object in the virtual world when the associated collaboration activity interacts with the object in the real world;

may identify if the speed at which the avatar or other virtual entity "runs" between objects so to determine if it is proportional to the amount of work effort of the collaboration activity in the real world;

may identify if the avatar is making gestures (such as fast hand movements) or other visual information (such as a color change) when the collaboration activity is being executed at a certain rate of speed or when there is a potential conflict/issue associated with the collaboration activity (for example, a fast moving hammer could represent a "design" activity that has been updated more than 5 times within the last 30 minutes);

may change the color or appearance of the avatar, other virtual entity and/or object being worked on based on the type of collaboration activity being represented (for example, an avatar could appear to look like a "crash test dummy", if the avatar is performing test simulations of the object being worked on);

may change the color or appearance of the avatar, other virtual entity and/or object being worked on based on the percentage complete of the collaboration activity (in the jet design example, a green "engine object" could have just started the activity, whereas a blue "engine object" is nearing completion). This visualization may also include a partially built object visualized in a manner that reflects which pieces are complete or incomplete (an example would be a "wing" object missing the "rudders"). This visualization may also include objects with a certain percentage complete text above the engine object or other markings;

may change the color or appearance of the avatar, other virtual entity and/or object being worked on based on the number or type of collaboration issue raised during the collaboration activity (for example, the avatar may turn red if a critical design issue has been identified or the engine could appear "broken" if a failed simulation occurred); or may change the color or appearance of an avatar, other virtual entity and/or object being worked on based on the critical path relationship of the collaboration activity (a green "engine object" could represent a part in the overall design identified as 'not in the critical path', whereas red objects could represent a part in the overall design identified as 'in the critical path').

The present invention provides the ability for computer controlled avatars or other virtual entities to be either rendered when (and only when) an automated collaboration activity they represent is being executed, or may be continually represented and only move when the activity invoked.

Collaboration activities in the real world are tracked. They may be tracked in the form of peer-to-peer interactions or brainstorming sessions that are to be visualized in the virtual world. An example may be a person working on a project in the real world may every "x" hours. The person may then log progress to a computer system that would be relayed to the virtual world simulation to a system for tracking hours and activity information. The present invention may easily be implemented to build upon such current systems. Other information such as percentage of activity complete or owner of activity may also be retrieved from a current project plan or product execution model.

Once the information has been transferred to the virtual world, the computer system rendering the virtual world may render the collaboration environment. Objects that are associated with the collaborative activity are rendered within a virtual region. For example, the collaboration of people building an aircraft may have wings, wheels, rudders rendered in the virtual world.

Each person who is working on a project may have an associated avatar. The avatar may be human or computer controlled (that is, controlled automatically by computer software) to move around the collaborative region in the virtual world. In the event that the avatar is computer controlled, event information about the process of the person's activity as used by the virtual world rendering computer system to move and change the appearance of the avatar accordingly.

This process is repeated such that, at any point in time, a viewing avatar can literally "watch" the progress of the project by studying the appearance and movement of each avatar.

Collaboration activities may represent (but are not limited to):

peer-to-peer interactions (such as a joint design work session being executed);

automated development tasks (such as modeling or workload simulations required during design or testing stages);

automated mechanical interactions (such as the workings of a jet engine or data transfer between control systems); or biological activities (such as having an avatar appear to be sleeping during extended periods of non-activity).

In each example, information about progress of the activity is collected. This information includes (but is not limited to):

the current work effort associated with the activity;

the current ownership of the collaboration artifacts;

the real time views of whom is working on an associated activity or deliverable;

the percentage of progress of the activity and deliverables; or the number of open issues associated with the activity or deliverable.

The progress and other information associated with the automated activity may be event driven (information is generated due to an event such as hitting a specific milestone within the execution of the activity) or synchronous (every "x" seconds, the activity is polled for progress). The information is fed into the virtual world.

FIG. 1 shows a system 100 that may have a data processing system 102 suitable for implementing an embodiment of the present invention. Data processing system 102 may have a computer system 104 connected to a display 120, external device(s) 116 and video camera 140 or other peripheral devices for providing a user an interface to computer system 140 being connected via I/O interface(s) 114. Computer system 104 may have an internal bus 112 for providing internal communication such modules as processing unit 106, I/O interface(s) 114, network adapter 138 and memory 110. Memory 110 may have random access memory (RAM) 130, cache 132 and storage system 118 or other forms of memory. RAM may take the form of integrated circuits that allow stored data to be accessed in any order (i.e., at random). Storage system 118 may take the form of tapes, magnetic discs and optical discs and are generally used for long term storage of data. Cache 132 is a collection of data duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or recomputing the original data. A cache has proven to be extremely effective in many areas of computing because access patterns in typical computer applications have locality of reference.

Figure 2:
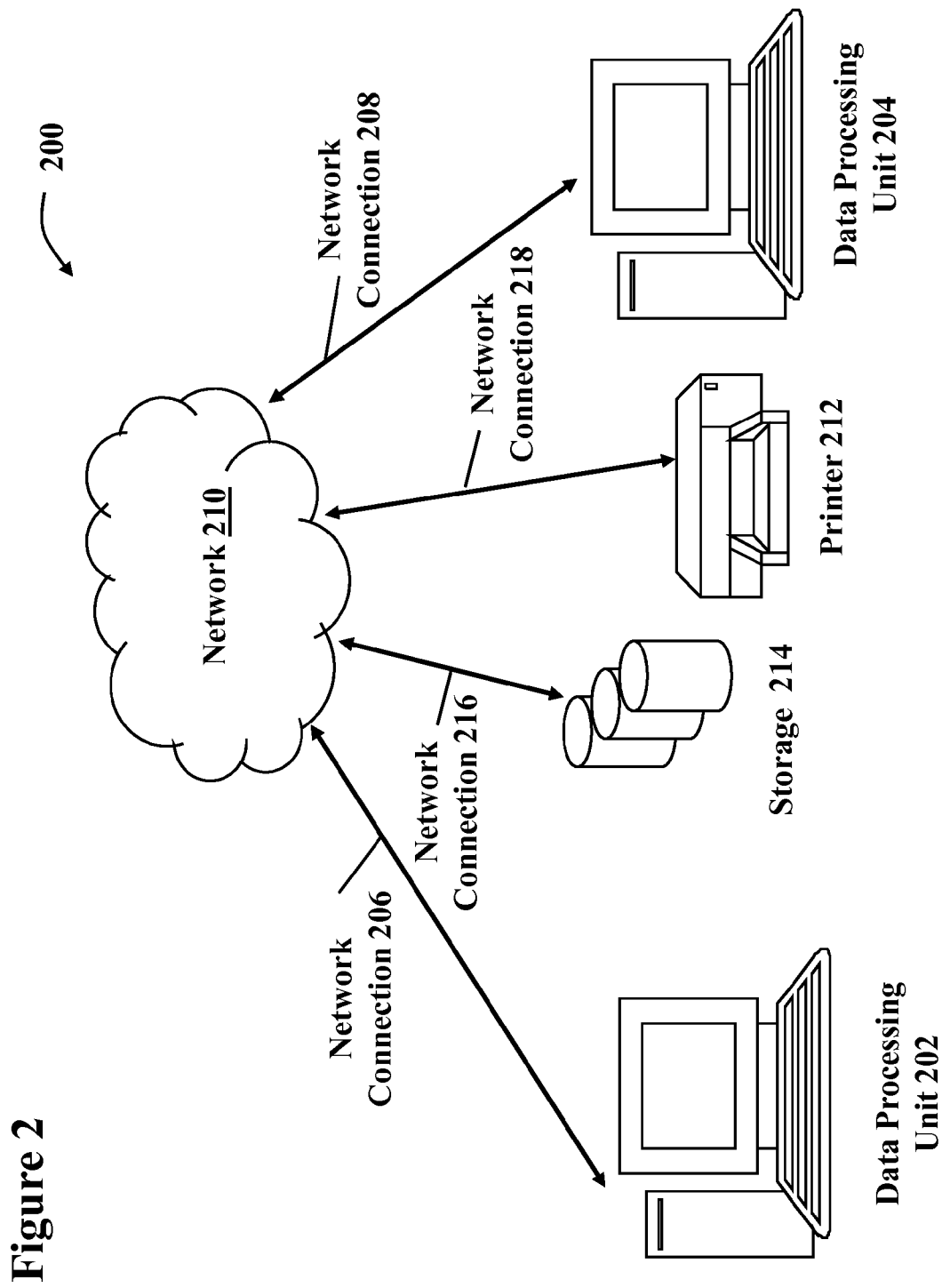
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, e.g., a local area network (LAN) or internetwork. Printer 212 and storage 214 may be connected to network 210 via network connections 216, 218. Basic network components may include network interface cards, repeaters, hubs, bridges, switches and routers. Data processing units 202, 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.).

Figure 3:
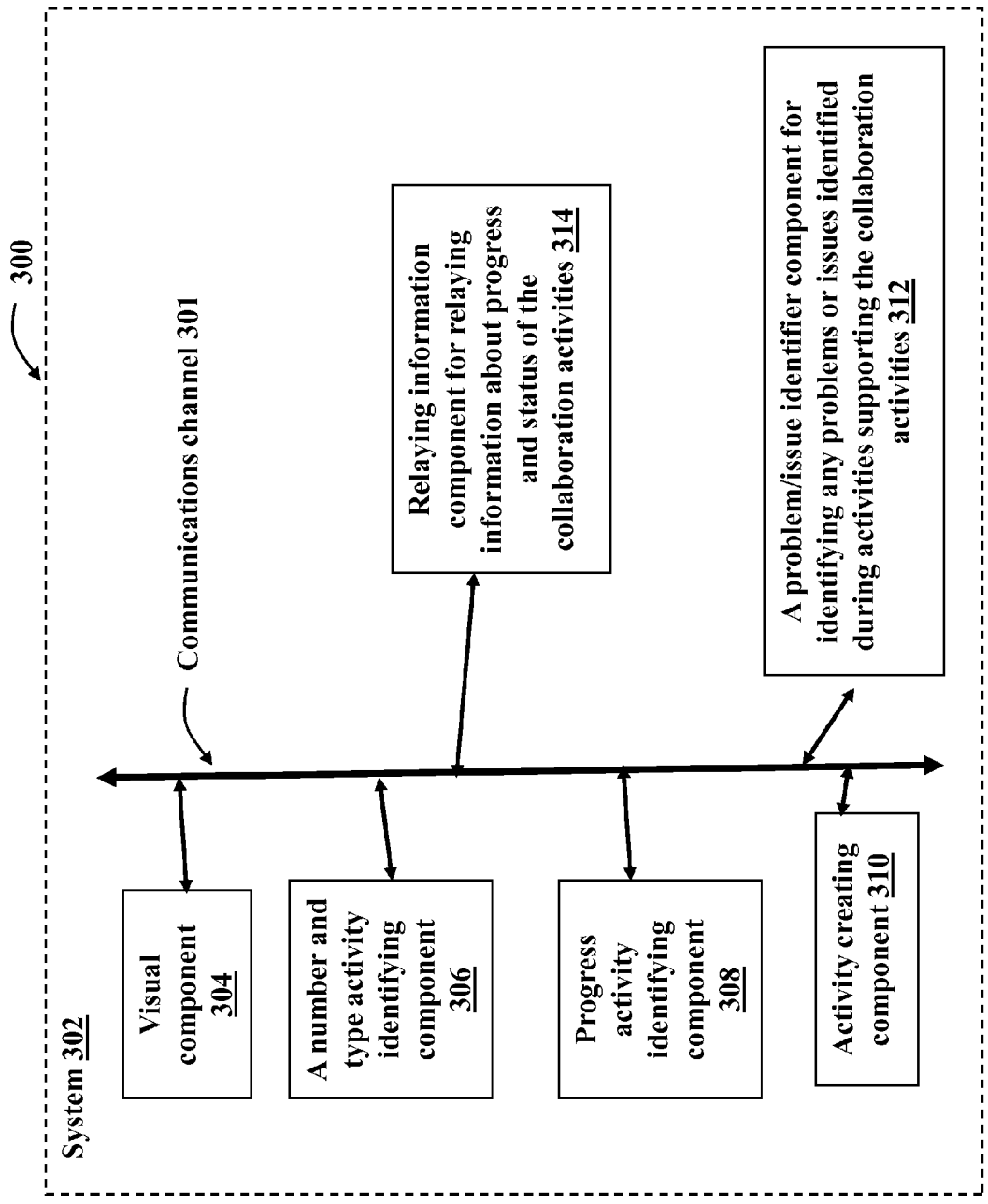
FIG. 3 illustrates a system for implementing the present invention.

FIG. 3 illustrates a virtual universe 300 having a system 302 of the present invention. System 302 may contain a visual component 304 for providing visual representations of collaboration activities within a virtual world. System 302 may further contain a number and type identifying component 306 for identifying the number and type of collaboration activities within the virtual world. System 302 may also contain a progress activity component 308 for identifying the progress activity of the collaboration activities within the virtual world. System 302 may also contain an activity creating component 310 for creating collaboration activities within the virtual world. System 302 may contain a problem/issue identifier component 312 for identifying problems and issues identified during activities supporting the collaboration activities within the virtual world. System 302 may contain a relaying information component 314 for relaying information about the progress and status of the collaboration activities. Communications channel 301 interconnects the components so that they can communicate with one another.

Figure 4:
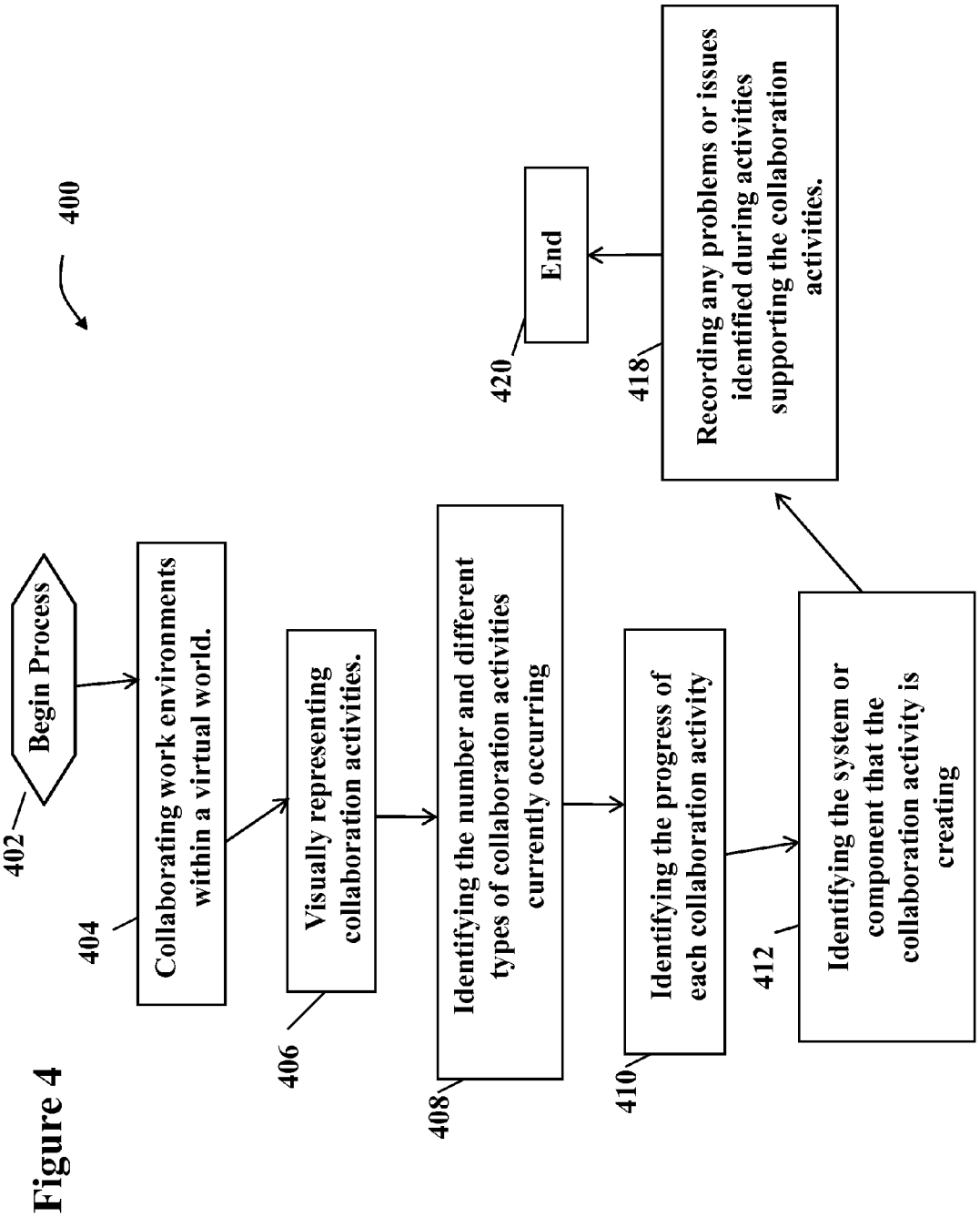
FIG. 4 illustrates an embodiment of a method of the present invention.

FIG. 4 illustrates a method 400 of one embodiment of the present invention which begins at 402 and continues at 404 where work environments are collaborated within a virtual world. At 406, collaboration activities are visually represented. At 408, the number and different types of collaboration activities currently occurring are identified. At 410, the progress of each collaboration activity is identified. At 412, the system or component that is creating a collaboration activity is identified. At 418, any problems or issues identified during activities supporting the collaboration activities are recorded and the method ends at 420.

Figure 5:
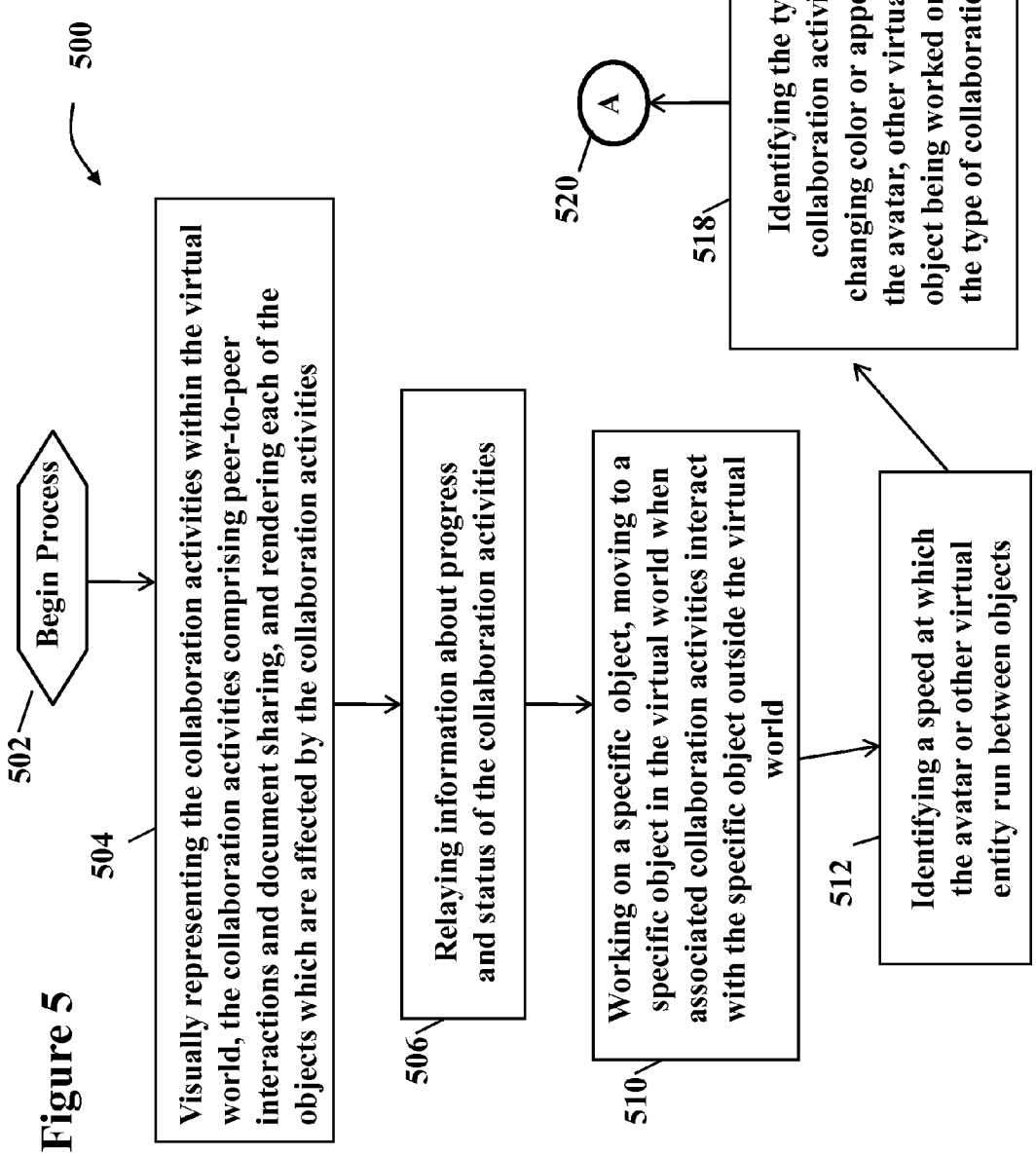
FIG. 5 illustrates another embodiment of the method of the present invention.

FIG. 5 illustrates a method 500 of another embodiment of the present invention which begins at 502 and continues at 504 where the collaboration activities are visually represented the within the virtual world, the collaboration activities may comprise peer-to-peer interactions and document sharing, and may render each of the objects which may be affected by the collaboration activities.

At 506, the information about the progress and status of the collaboration activities is relayed. At 508, when a specific object is being worked on, the specific object is moved to a in the virtual world when associated collaboration activities interact with the specific object outside the virtual world. At 510, a specific object is worked on moving to the specific object in the virtual world when associated collaboration activities interact with the specific object outside the virtual world. At 512, a component identifies a speed at which the avatar or other virtual entity run between objects. At 518, a component identifies the type of collaboration activity and changing color or appearance of the avatar, other virtual entity or object being worked on based on the type of collaboration activity. At 520, the method continues to "A".

Figure 6:
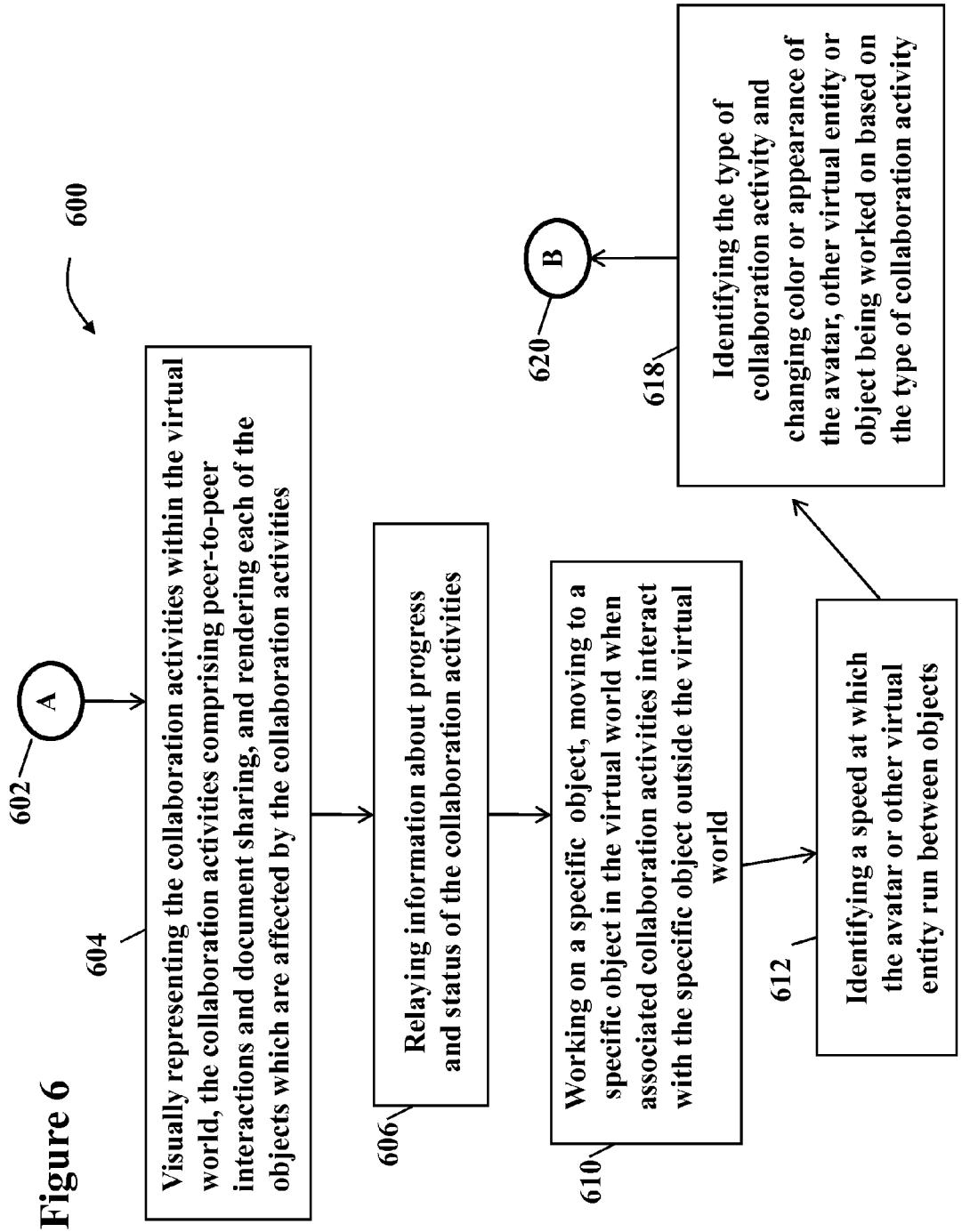
FIG. 6 illustrates another embodiment of the method of the present invention.

FIG. 6 continues at method 600 where at 602 "A" where the method continues to 604 and describes the step of visually representing the collaboration activities within the virtual world, the collaboration activities comprising peer-to-peer interactions and document sharing, and rendering each of the objects which are affected by the collaboration activities. At 606, the method continues where the method comprises relaying information about progress and status of the collaboration activities. At 610, the method continues to working on a specific object and moving to the specific object in the virtual world when associated collaboration activities interact with the specific object outside the virtual world. At 612, the method continues to identifying a speed at which the avatar or other virtual entity runs between objects. At 618, the method continues with identifying the type of collaboration activity and changing color or appearance of the avatar, other virtual entity or object being worked on based on the type of collaboration activity and continues with "B" at 620.

FIG. 7 illustrates a method 700 of the present invention continuing at "B" 702 and continues to 704 where the color or appearance of the avatar, other virtual entity and/or object being worked on are changed based on the percentage complete of the collaboration activity, or upon the percentage complete of the collaboration activity, or upon the number or type of collaboration issue raised during the collaboration activity, or upon the critical path relationship of the collaboration activity. At 706, the method continues to working on a specific object, moving to a specific object in the virtual world when associated collaboration activities interact with the specific object outside the virtual world. At 708, the method continues to identifying a speed at which the avatar or other virtual entities runs between objects. At 710, the method continues to identifying the type of collaboration activity and changing color or appearance of the avatar, other virtual entity or object being worked on based on the type of collaboration activity and the method ends at 712.

It should be understood that the present invention is typically computer-implemented via hardware and/or software. As such, client systems and/or servers will include computerized components as known in the art. Such components typically include (among others), a processing unit, a memory, a bus, input/output (I/O) interfaces, external devices, etc.

While shown and described herein as a system and methods to allow for building collaboration work environments within a virtual world through computer generated avatars and other three dimensional (3D) objects in a virtual world. While the present invention also provides for business applications for allowing collaboration, collaboration activities and collaboration output which are rendered within the 3D virtual world, it is understood that the invention further provides various alternative embodiments. For example, in one embodiment, the invention provides a computer-readable/useable medium that includes computer program code to enable a computer infrastructure for a system to allow a datacenter in a virtual world to be morphed based upon roles, events and activities. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for building collaboration work environments within a virtual world through computer generated avatars and other three dimensional (3D) objects in a virtual world. In this embodiment of the present invention, a computerized infrastructure may be provided and one or more systems may be provided for performing process steps of the invention that may be obtained and deployed to the computerized infrastructure.

The deployment of a system can comprise one or more of installing program code on a computing device, such as computer system from a computer-readable medium, adding one or more computing devices to the computer infrastructure, and incorporating and/or modifying one or more existing systems of the computer infrastructure to enable the computerized infrastructure to perform the method steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for collaborating work environments within a virtual world, which is outside of a real world, through computer generated avatars and other three dimensional (3D) objects to visualize collaboration activities and allowing for tracking a progress of collaboration activities, the method comprising the computer-implemented steps of:
visually representing collaboration activities;
identifying a number and different types of collaboration activities currently occurring in the world;
identifying the progress of each collaboration activity; identifying the system or component that the collaboration activity is creating; displaying a 3D replica in the virtual world of the system component in real-time during creation in the real world;
rendering a set of avatars corresponding to a set of users involved in the collaboration activities currently occurring in the real world for the system or component, wherein each of the set avatars relocates to the 3D replica in the virtual world of the system or component when each of the set of users becomes involved in the collaboration activities occurring in the real world; and
identifying representing, within the virtual universe, any problems or issues identified during activities supporting the collaboration activities.

2. The method as defined in claim 1 further comprising the computer-implemented step of visually representing the collaboration activities within the virtual world, the collaboration activities comprising at least one of: peer-to-peer interactions and document sharing, and rendering each of a set of objects which are affected by the collaboration activities.

3. The method as defined in claim 2 further comprising the computer-implemented step of relaying information about progress and status of the collaboration activities.

4. The method as defined in claim 1 further comprising the computer-implemented step of working on a specific object, and one or more of the set of avatars moving to a specific object in the virtual world when associated collaboration activities interact with the specific object outside the virtual world.

5. The method as defined in claim 1 wherein one or more of the set of avatars runs between objects in the virtual world, the method further comprising the computer-implemented step of identifying a speed at which the one or more of the set of avatars runs between the objects, the speed being proportional to an amount of work effort of the collaboration activities in the real world.

6. The method as defined in claim 1 further comprising the computer-implemented step of identifying a type of collaboration activity; and changing a color or appearance of one or more of the set of avatars, an object being worked on based on the type of collaboration activities.

7. The method as defined in claim 6 further comprising the computer-implemented step of changing the color or appearance of the one or more of the set of avatars, other virtual entity and/or the object being worked on based on the percentage complete of the collaboration activities.

8. The method as defined in claim 7 further comprising the computer-implemented step of changing the color or appearance of the one or more of the set of avatars or the object being worked on based upon a number or type of collaboration issue raised during the collaboration activity.

9. The method as defined in claim 7 further comprising the computer-implemented step of changing the color or appearance of the one or more of the set of avatars, other virtual entity and/or the object being worked on based upon a critical path relationship of the collaboration activity.

10. The method as defined in claim 7 further comprising the computer-implemented step of continually rendering the set of avatars and restricting movement of the set of avatars until the collaboration activities are invoked.

11. A system for collaborating work environments within a virtual world, which is outside of a real world, through computer generated avatars and other three dimensional (3D) objects to visualize collaboration activities and allowing for tracking progress of collaboration activities, the system comprising:
a memory medium comprising instructions;
a bus coupled to the memory medium; and
a processor coupled to a controller via the bus that when executing the instructions causes the system to:
visually represent collaboration activities;
identify the number and different types of collaboration activities currently occurring, in the real world; identify the progress of each collaboration activity;
identify a system or component that the collaboration activity is creating, wherein the visual component displays a 3D replica in the virtual world of the system or component in real-time during creation in the real world,
wherein the visual component renders a set of avatars corresponding to a set of users involved in the collaboration activities currently occurring in the real world for the system or component, wherein each of the set avatars relocates to the 3D replica in the virtual world of the system or component when each of the set of users becomes involved in the collaboration activities occurring in the real world; and represent, within the virtual universe, any problems or issues identified during activities supporting the collaboration activities.

12. The system as defined in claim 11 the instructions causing the system to represent the collaboration activities within the virtual world, the collaboration activities comprising at least one of: peer-to-peer interactions and document sharing, and rendering each of a set of objects which are affected by the collaboration activities.

13. The system as defined in claim 11 further comprising instructions causing the system to relay information component for relaying information about progress and status of the collaboration activities.

14. A computer-readable storage medium storing computer instructions, which when executed, enables a computer system to collaborate work environments within a virtual world, which is outside of a real world, through computer generated avatars and other three dimensional (3D) objects to visualize collaboration activities and allowing for tracking progress of collaboration activities, the computer instructions comprising:
    visually representing collaboration activities within a computer generated virtual world;
    identifying a number and different types of collaboration activities currently occurring, in a real world;
    identifying a progress of each collaboration activity; identifying one or more components that the collaboration activity is creating;
    displaying a 3D replica in the virtual world of the one or more components in real-time during creation in the real world;
    rendering a set of avatars corresponding to a set of users involved in the collaboration activities currently occurring in the real world for the one or more components, wherein each of the set avatars relocates to the 3D replica in the virtual world of the one or more components when each of the set of users becomes involved in the collaboration activities occurring in the real world; and
    representing, within the virtual universe, one or more problems identified during activities supporting the collaboration activities.

15. The computer-readable storage medium as defined in claim 14 wherein the method further comprises visually representing the collaboration activities within the virtual world, the collaboration activities comprising at least one of: peer-to-peer interactions and document sharing, and rendering each of a set of objects which are affected by the collaboration activities.

16. The computer-readable storage medium as defined in claim 14 wherein the method further comprises relaying information about progress and status of the collaboration activities.

17. The computer-readable storage medium as defined in claim 14 wherein the method further comprises continually rendering the set of avatars and restricting movement of the set of avatars until the collaboration activities are invoked.

18. A method for deploying computing infrastructure comprising integrating computer-readable code into a computing system, wherein the code in combination with the computing system is capable of performing a process for collaborating work environments within a virtual world, which is outside of a real world, through computer generated avatars and other three dimensional (3D) objects to visualize collaboration activities and allowing for tracking a progress of collaboration activities, the process comprising:
    visually representing collaboration activities;
    identifying a number and different types of collaboration activities currently occurring in the real world;
    identifying a progress of each collaboration activity; identifying one or more components that the collaboration activity is creating;
    displaying a 3D replica in the virtual world of the one or more components in real-time during creation in the real world;
    rendering a set of avatars corresponding to a set of users involved in the collaboration activities currently occurring in the real world for the one or more components, wherein each of the set avatars relocates to the 3D replica in the virtual world of the one or more components when each of the set of users becomes involved in the collaboration activities occurring in the real world; and
    representing, within the virtual universe, one or more problems identified during activities supporting the collaboration activities.

19. The method as defined in claim 18 wherein the process further comprises visually representing the collaboration activities within the virtual world, the collaboration activities comprising at least one of: peer-to-peer interactions and document sharing, and rendering each of a set of objects which are affected by the collaboration activities.

20. The method as defined in claim 19 wherein the process further comprises working on a specific object outside the virtual world, and moving to a specific object from the set of objects in the virtual world when associated collaboration activities interact with the specific object outside the virtual world.

21. The method as defined in claim 19 wherein one or more of the set of avatars runs between the set of objects in the virtual world, the method further comprising identifying a speed at which the one or more of the set of avatars runs between the set of objects, the speed being proportional to an amount of work effort of the collaboration activities in the real world.

22. The method as defined in claim 18 wherein the process further comprises relaying information about progress and status of the collaboration activities.

* * * * *